United States Patent [19]

Reiner

[11] Patent Number: 4,560,255

[45] Date of Patent: Dec. 24, 1985

[54] ENLARGING AND READING APPARATUS

[75] Inventor: Josef Reiner, Rodenkirchen, Fed. Rep. of Germany

[73] Assignee: Oculus Optikgeraete GmbH, Dutenhofen, Fed. Rep. of Germany

[21] Appl. No.: 493,911

[22] Filed: May 12, 1983

[30] Foreign Application Priority Data

May 13, 1982 [DE] Fed. Rep. of Germany ....... 3217939

[51] Int. Cl.$^4$ ...................... G02B 17/08; G02B 21/14; G02B 27/02
[52] U.S. Cl. .................................... 350/503; 350/507; 350/514; 350/602; 350/624
[58] Field of Search .............. 350/296, 503, 537, 507, 350/290, 574, 577, 442, 602, 514, 518, 624

[56] References Cited

U.S. PATENT DOCUMENTS

| 2,590,657 | 3/1952 | Shepard | 350/602 |
| 2,698,553 | 1/1955 | Copeland . | |
| 2,813,458 | 11/1957 | Tripp et al. | 350/503 |
| 3,598,468 | 8/1971 | Perry | 350/296 |
| 4,403,842 | 9/1983 | Aulhorn et al. . | |

FOREIGN PATENT DOCUMENTS

| 2710995 | 9/1977 | Fed. Rep. of Germany | 350/503 |
| 267594 | 3/1927 | United Kingdom . | |

Primary Examiner—Jon W. Henry
Attorney, Agent, or Firm—Flynn, Thiel, Boutell & Tanis

[57] ABSTRACT

An enlarging apparatus includes a base with an upright post and a housing supported on the post above the base. An optical system in the housing includes a vertically adjustable, downwardly facing concave mirror having its focal point adjacent the base and a semi-transparent mirror arranged along and inclined with respect to the optical axis of the concave mirror. Light beams from an object supported on the base pass through the semi-transparent mirror, are reflected by the concave mirror, and are then reflected by the semi-transparent mirror. A binocular telescope is supported on the housing in alignment with the path of the beams reflected by the semi-transparent mirror.

9 Claims, 2 Drawing Figures

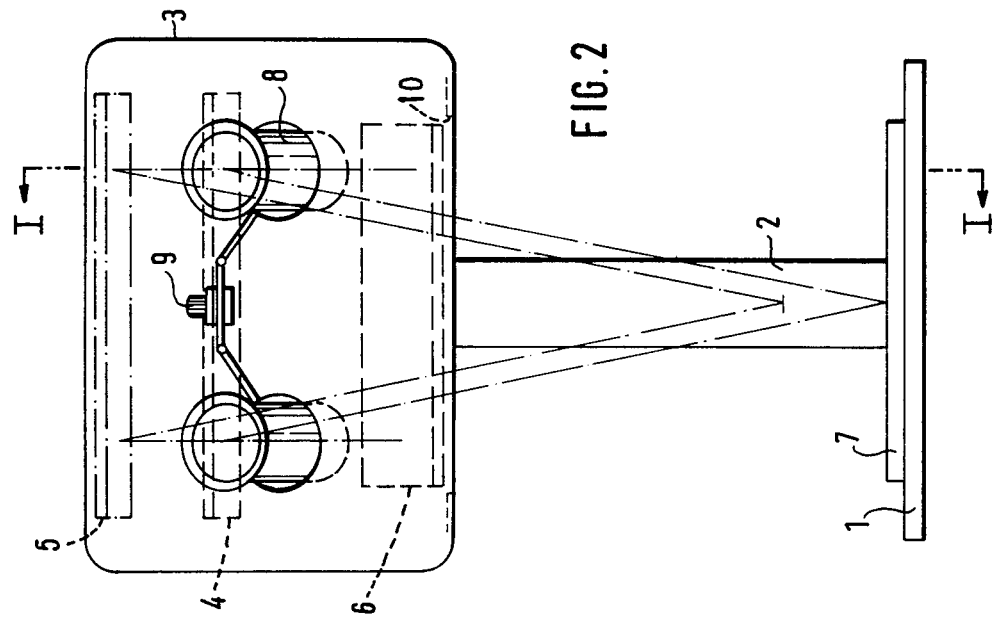
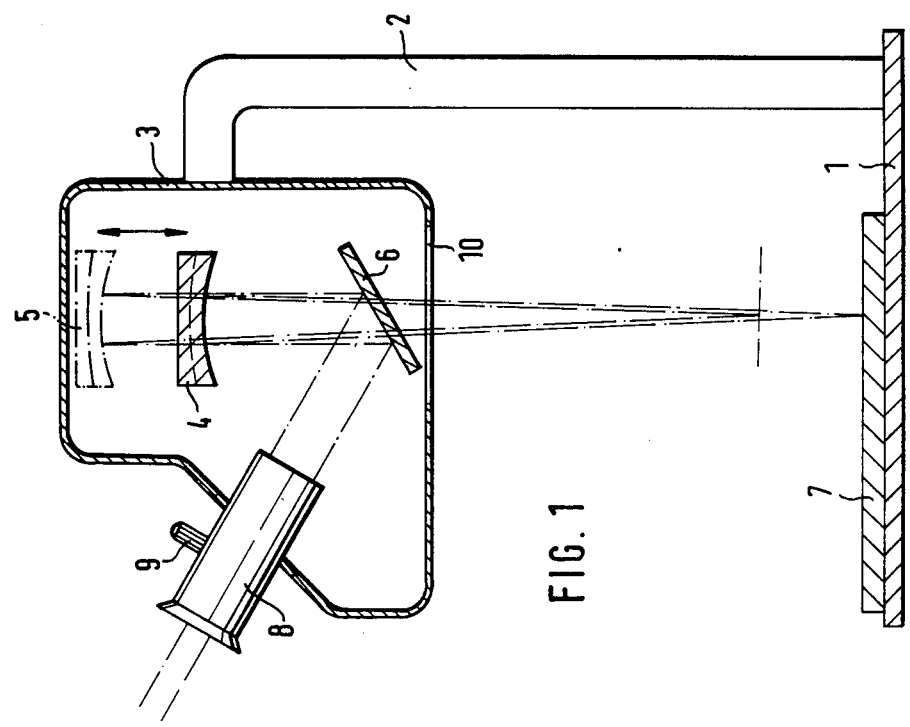

ENLARGING AND READING APPARATUS

FIELD OF THE INVENTION

This invention relates to an enlarging apparatus and, more particularly, to a reading apparatus for visually impaired persons.

BACKGROUND OF THE INVENTION

Enlarging or reading apparatuses are used by visually impaired persons in order to be able to decipher writing, by factory workers for installation of small parts, and by doctors for surgical operations.

The use of magnifying lenses or of magnifying glasses is limited to cases where only a relatively small enlargement is needed. Here, individual lenses or multi-part systems are arranged in suitably sturdy spectacle frames which are secured on the head with a rubber band. These spectacles permit, depending on their design, monocular or binocular viewing. A disadvantage of these enlarging systems is that the working distance is very small for greater enlargements, which makes reading extremely difficult or even impossible.

Multi-part systems are also known, which are built according to the principle of the Galilei telescope. These do have a larger working distance, but the field of vision is considerably limited and is in addition not sharply defined at greater enlargements, due to the character of the Galilei telescope. If one uses here a binocular system, then a strong convergence is needed, which during constant use is very tiring for the user. Moreover, these systems are so heavy that, when constructed in spectacle form, they cannot be worn for a long period of time.

Systems are also known which are built, according to the system of the Kepler telescope, with a reversing arrangement. The advantage here is that a large and sharply defined field of vision is obtained, even in the case of a great enlargement. A further advantage is that the working distance is considerably greater than in the case of simple lenses with equal enlargement. However, these systems also have a very heavy weight and require, for binocular use, a strong convergence.

All of the above-mentioned systems have the common disadvantage that the relationship between the reading material and the viewing system is unstable. For example, unavoidable trembling motions are amplified by the great enlargement, which considerably increases the difficulty of reading. Moreover, the working distance is so small that, in order to turn a page, movement of the device away from the reading material is necessary. This means a renewed difficulty of finding the lines being read.

Reading apparatuses are also known which permit an enlargement of up to forty times. However, we deal here with television reading apparatuses which are very expensive to purchase and do not permit easy handling. Moreover, these apparatuses can be utilized only stationarily.

A basic purpose of the invention is therefore to provide an enlarging and reading apparatus in which, even in the case of an enlargement of up to sixteen times and binocular viewing, convergence and accommodation for the viewing of the object are not necessary, in which the working distance between the apparatus and the object is large, in which a large and sharply defined field of vision is obtained, in which aberration-free reproduction is assured, and which permits fatigue-proof viewing and is inexpensive to manufacture.

SUMMARY OF THE INVENTION

This purpose is attained according to the invention by providing an apparatus having a concave mirror, in the optical axis of which, between the concave mirror and its focal point, a semi-transparent mirror is provided which is inclined with respect to the optical axis. A monocular or binocular telescope is provided for viewing the reflecting surface of the semi-transparent mirror and with this the object. The inventive apparatus thus includes, in a simple form, a concave mirror, a semi-transparent mirror and a commercially available telescope. The object to be viewed is arranged at the focal point of the concave mirror and is viewed by means of the telescope and the semi-transparent mirror, which is inclined to and arranged along the optical axis of the concave mirror. The distance between the object and the apparatus is advantageously 30 cm, so that turning of pages or handling of the viewed object can occur without interference.

The apparatus is advantageously arranged to be stationary, the viewed object being moved below the apparatus until a desired point thereon comes into the field of vision of the viewer. The optical axis is advantageously arranged vertically, so that the viewer can view the object in a comfortable reading position, namely with a downwardly inclined view. The viewing can be done through a commercially available field glass, which must be set to infinity. Through the optical system of a semi-transparent mirror and a concave mirror, the object is reproduced at infinity, so that it can be viewed binocularly without accommodation and convergence using the field glass which is set to infinity. Due to the stationary arrangement of the apparatus, any trembling of the viewer is of no importance. In addition, it is possible to use the apparatus for long periods without fatigue.

The degree of enlargement depends on the enlargement of the binocular or monocular telescope which is being used. An enlargement range of between six and sixteen has proven advantageous in actual use.

Axis-symmetrical ametropies can be corrected by adjusting the respective eyepieces of binocular field glasses in accord with the ametropy. This is done by having the user adjust the field glasses prior to use in the system while viewing a remote article. The adjusted field glasses are then inserted into a mounting on the apparatus. The advantages of the inventive apparatus include a large working distance, a large and sharply defined field of vision and, through the use of a mirror system, a sharp, aberration-free reproduction. Moreover, the apparatus can be easily transported.

The concave mirror, semi-transparent mirror and telescope are advantageously arranged in a housing which is carried by a frame supported on a base plate. The object to be viewed is placed on the base plate. To bring the object into sharp focus, either the base plate can be adjusted in height or the concave mirror can be moved to adjust its distance from the base plate. It has proven advantageous to support a cross-table on the base plate, which assures movement of the object in the plane of viewing.

It is also conceivable to support the apparatus on a wall or in any other fashion, so that various tasks, such as product assembly or surgery, can be carried out with the apparatus.

BRIEF DESCRIPTION OF THE DRAWINGS

One exemplary embodiment of the invention will be described in greater detail hereinafter in connection with the drawing, in which:

FIG. 1 is a sectional side view taken along the line I—I of FIG. 2; and

FIG. 2 is an elevational front view of the apparatus of FIG. 1.

DETAILED DESCRIPTION

The apparatus which is illustrated in FIGS. 1 and 2 includes a base plate 1 on which is supported a vertical frame or post 2 which extends perpendicular to the base plate 1. A housing 3 is secured to the upper end of the frame 2 and an optical system is provided therein.

The optical system includes a downwardly facing concave spherical mirror 4, the vertical position of which is adjustable. Reference numeral 5 identifies the upper position of the concave mirror, which is illustrated by dash-dotted lines. The optical axis of the concave mirror 4 extends perpendicular to and has a focal point near the base plate 1. A semi-transparent mirror 6 is arranged along and inclined with respect to such optical axis at a location between the mirror and its focal point, its upper surface being the reflective one. The mirror 6 permits light beams which come from an object 7 on the base plate 1 to pass through the mirror 6 to the concave mirror 4, which reflects them, and the beams which are reflected by the concave mirror 4 are then reflected to the left in FIG. 1 by the mirror 6. A binocular telescope 8 is inserted in two openings provided in the housing 3 in alignment with the path of the reflected beam. The binocular telescope can be supported on the housing 3 by means of a mounting arrangement 9.

In the region of the optical axis of the concave mirror 4, the housing 3 is provided with an opening 10 in its bottom wall. Illumination of the object 7 can be effected by conventional lamps (not illustrated) provided on the housing 3, or by separate lamps.

A cross-table (not illustrated) can advantageously be supported on the base plate 1 to assure movement of the object 7 in a plane parallel the base plate, so that a viewer who looks through the binocular telescope 8 can watch the object free from vibration. The distance between the object 7 and housing 3 of the apparatus is advantageously at least 300 mm, which permits satisfactory working and handling underneath the housing. However, it is also conceivable to choose other distances.

An advantage of the inventive apparatus is that a binocular enlargement of six to sixteen times can easily be achieved. A monocular enlargement can be even greater yet. A further advantage is the comfortable reading position of the viewer, who with a downward look can view the object. Moreover, the inventive apparatus can be easily transported, so that it can also be taken along to libraries. A further advantage of the inventive apparatus is that it has high optic quality and a sharply defined and large field of vision.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an enlarging apparatus adapted to help a visually impaired person read, including a concave mirror having an optical axis and having a focal point on said optical axis at a location spaced from said concave mirror, and a semitransparent mirror which is inclined relative to said optical axis of said concave mirror, the improvement comprising wherein said optical axis of said concave mirror intersects said semitransparent mirror, said semitransparent mirror being located between said concave mirror and said focal point thereof; including telescope means through which a reflection from said semitransparent mirror of an object which is to be viewed can be observed at infinity; and wherein the distance of said concave mirror from said object can be adjusted.

2. The apparatus according to claim 1, wherein said concave mirror and said semitransparent mirror are arranged in a housing which has an opening through which said optical axis of said concave mirror extends.

3. The apparatus according to claim 2, wherein said housing has a mounting which supports said telescope means.

4. The apparatus according to claim 2, wherein said housing is supported by a frame which is in turn supported on a base plate, and wherein said optical axis of said concave mirror extends approximately perpendicular to said base plate.

5. The apparatus according to claim 4, wherein said base plate is provided with a cross-table.

6. An enlarging apparatus, comprising: a concave mirror having an optical axis and having a focal point on said optical axis at a location spaced from said concave mirror; a substantially planar, semitransparent mirror supported between said concave mirror and said focal point thereof, said semitransparent mirror being intersected by and being inclined with respect to said optical axis, light traveling toward said concave mirror along said optical axis passing through said semitransparent mirror and light traveling away from said concave mirror along said optical axis being reflected by said semitransparent mirror; telescope means for viewing at infinity an image reflected from said semitransparent mirror; support means for supporting an object to be viewed in the region of said focal point of said concave mirror so as to face toward said concave mirror; and means supporting said concave mirror for movement in directions substantially parallel to said optical axis relative to said semitransparent mirror, said telescope means and said support means; wherein light from an object on said support means which is to be viewed passes through said semitransparent mirror, is then reflected by said concave mirror, is then reflected by said semitransparent mirror, and then passes through said telescope means.

7. The apparatus according to claim 6, including a base plate, a post extending upwardly from said base plate, and a housing supported at an upper end of said post; wherein said support means is an upwardly facing surface on said base plate; wherein said semitransparent mirror is stationarily supported in said housing, said telescope means is stationarily supported on said housing, and said concave mirror is vertically movably supported within said housing, said concave mirror facing downwardly and said optical axis thereof extending generally vertically; and wherein said housing has an opening in a bottom wall thereof, said optical axis of said concave mirror extending through said opening in said housing.

8. The apparatus according to claim 7, including mounting means which removably supports said telescope means on said housing.

9. The apparatus according to claim 8, wherein said telescope means is a binocular optical viewing arrangement.

* * * * *